United States Patent [19]

Kojima et al.

[11] Patent Number: 5,101,386
[45] Date of Patent: Mar. 31, 1992

[54] TRACK JUMPING APPARATUS FOR AN OPTICAL DISK PICKUP

[75] Inventors: Kunio Kojima, Nara; Masaru Nomura; Tomiyuki Numata, both of Tenri; Takashi Iwaki, Nara, all of Japan

[73] Assignee: Sharp Kabushiki Kaisha, Osaka, Japan

[21] Appl. No.: 382,233

[22] Filed: Jul. 19, 1989

[30] Foreign Application Priority Data

Jul. 22, 1988 [JP] Japan .................. 63-184086

[51] Int. Cl.$^5$ .................................. G11B 7/00
[52] U.S. Cl. ...................... 369/32; 369/44.28
[58] Field of Search .............. 369/32, 44.28, 44.25, 369/44.27; 358/342

[56] References Cited

U.S. PATENT DOCUMENTS 4,321,700 3/1982 Russell .................. 369/44.18
4,932,013 6/1990 Kojima et al. .................. 369/32

FOREIGN PATENT DOCUMENTS

155578 9/1983 Japan .

Primary Examiner—Robert L. Richardson
Attorney, Agent, or Firm—Cohen, Pontani & Lieberman

[57] ABSTRACT

A track jumping apparatus for an optical disk pickup which can detect a tracking error signal in performing a track jump, and determine a time of acceleration or deceleration of a jump signal by comparing the tracking error signal with a reference level, the track jumping apparatus comprising storing device for storing of standard values corresponding to the kinds of track jumps, standard value selecting device for selecting a standard value corresponding to a kind of track jump in performing the track jump, reference level setting device for setting a reference level so that the ratio of the reference level to a peak value of the tracking error signal agrees with a value based on the standard value selected by the standard value selecting device in performing the track jump, and standard value amending device for amending the standard value in the storing device selected at that moment according to a state of the tracking error signal at the end of the track jump.

5 Claims, 11 Drawing Sheets

TRACK JUMPING APPARATUS FOR AN OPTICAL DISK PICKUP

BACKGROUND OF THE INVENTION

1. Field of the Invention

The present invention relates to a track jumping apparatus for an optical disk pickup for jumping a light beam from the optical disk pickup over tracks on an optical disk.

2. Description of the Prior Art

Figure 7:
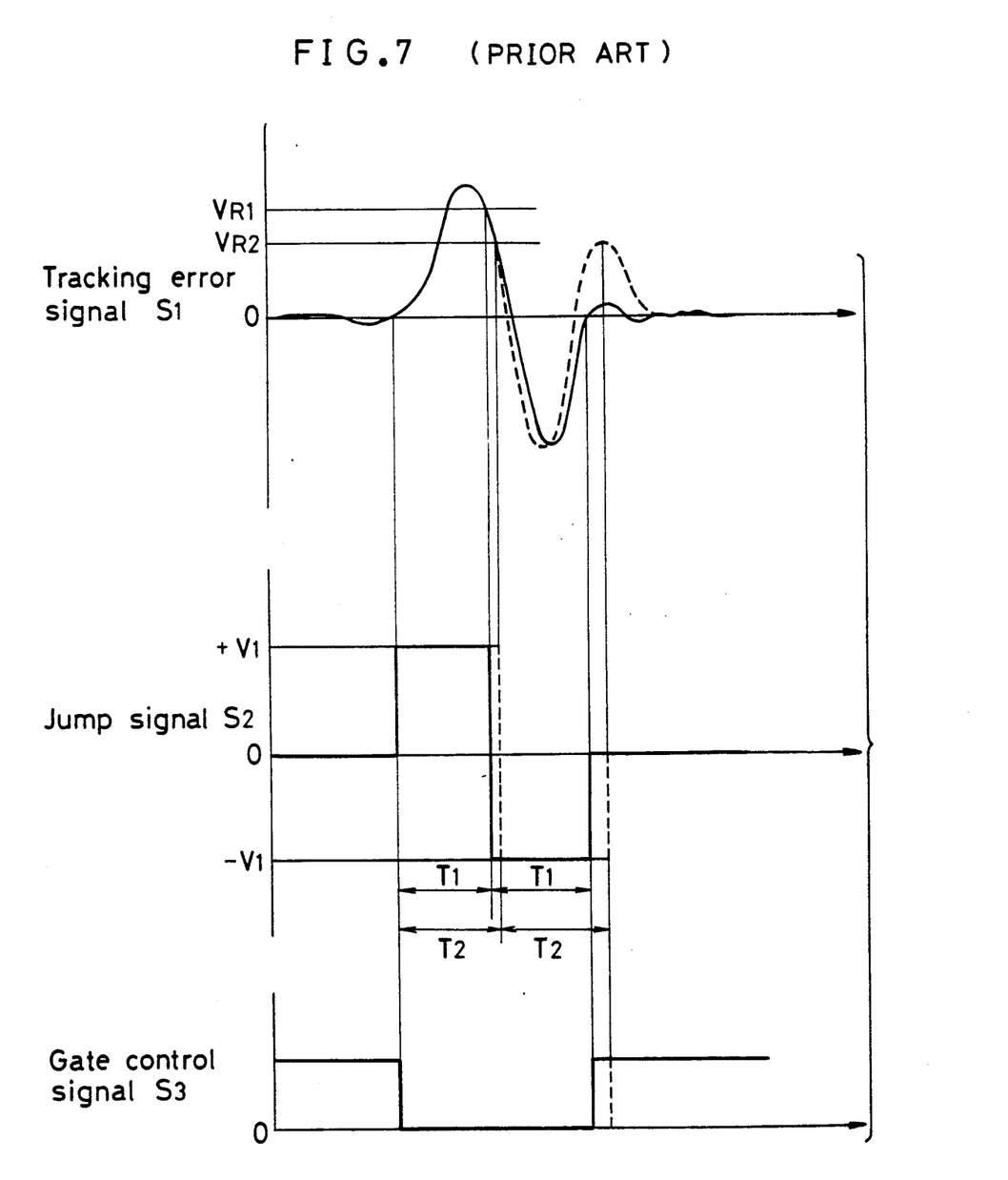
FIG. 7 is a timing chart showing waveforms of a tracking error signal, a jump signal and the like when a reference level is varied.

The track jumping apparatus for an optical disk pickup moves a light beam between tracks by sending a jump signal $S_2$, an exemplary waveform of which is shown in FIG. 7, to a tracking actuator. Also, a tracking servo loop is opened during this track jump by turning a gate control signal $S_3$ to "LOW". An exemplary waveform of $S_3$ is also shown in FIG. 7.

This jump signal $S_2$ accelerates the tracking actuator by applying a pulse of $+V_1$ volt for a time T, and subsequently decelerates and stops the tracking actuator by applying a pulse of $-V_1$ volt for the same time T, and thus the light beam can be moved by one track at a time during this operation. Accordingly, the quantity of a tracking error signal $S_1$ is increased to one side as the light beam parts from the track. However, when the light beam exceeds the center line of the space between tracks, it approaches an adjacent track from the reverse side, and therefore the quantity of error is inverted abruptly, being increased on the other side. Then, as the light beam further approaches the adjacent track, the quantity of error is decreased to a greater extent, and finally, when the quantity reaches zero, the track jump is completed.

Examples of such waveforms $S_1$, $S_2$, and $S_3$ and the manner in which they change over time in accordance with prior art track jumping devices is shown in FIG. 7.

Where the time of acceleration or deceleration of the jump signal is $T_1$, as shown, for example by a solid line the gate control signal $S_3$ thereafter returns to "HIGH" and closes the tracking servo loop, and the tracking error signal $S_2$ soon converges towards zero. Consequently, the light beam quickly stops on nearly the adjacent track, and therefore a stable track jump can be performed. Then, when the time of acceleration or deceleration is set to $T_2$ which is longer than $T_1$, as shown by a broken line in FIG. 7, the light beam overshoots the adjacent track to a large extent at the end of deceleration of the tracking actuator, and therefore the tracking error signal $S_1$ has not returned to zero after the gate control signal $S_3$ has closed the tracking servo loop, and a period of time is subsequently required to stabilize the tracking servo. Also, when the time of acceleration or deceleration is excessively short, the tracking servo loop is closed before the light beam fully reaches the adjacent track, and likewise a period of time is required to stabilize the tracking servo. This means that in performing a track jump, an optimum time for acceleration or deceleration must be determined.

However, f the time T of acceleration or deceleration of the jump signal is fixed in advance to a constant time whereby an optimum track jump is obtained, a stable track jump cannot be obtained where a track pitch is not constant, or where a change takes place in the characteristics of the tracking actuator.

For this reason, in an invention described in the Japanese Published Unexamined Patent Application No. SHO 59(1984)-84379, overshooting or undershooting of a jump is determined by the state of the tracking error signal $S_1$ at the end of each track jump, and thereby the time T of acceleration or deceleration of the subsequent jump is adjusted accordingly. However, a device incorporating such a methodology is effective if the length of time to make the adjustments is short in comparison with the jump time, but cannot accommodate conditions where rapid changes must occur over relatively short periods of time.

Also, in the Japanese Published Examined Patent Application No. SHO 57(1982)-1051, an invention has been disclosed wherein the time T of acceleration or deceleration is adjusted based on a comparison of the tracking error signal $S_1$ during track jump to a reference level $V_R$. The method taught by this reference, also shown in FIG. 7, compares the tracking error signals $S_1$ with a reference level $V_{R1}$, and changes the jump signal $S_2$ to the deceleration signal upon intersection with the reference level $V_{R1}$ at which time the quantity of error is inverted between the tracks, and thereby obtains an optimum time $T_1$ of acceleration or deceleration. For example, when this reference level $V_{R1}$ is set at a lower level to $V_{R2}$, as shown by a broken line in FIG. 7, the timing of the changeover of the jump signals $S_2$ is delayed, and the time of acceleration or deceleration is extended to as long as $T_2$, and as described above, the light beam jumps an amount which overshoots the target track. Accordingly, by setting a suitable reference level $V_R$ in advance, the optimum time T of acceleration or deceleration is obtainable, and the apparatus can accommodate for expansion and contraction of the tracking error signal $S_1$ on the time axis.

Also, real-time control is made possible, and therefore a stable track jump can be performed even when a short period of change is required. However, as taught by the aforementioned publication, when a level change takes place in the tracking error signal $S_1$, the relationship between the waveform of this tracking error signal $S_1$ and the reference level $V_R$ is not kept constant, and a stable track jump cannot be performed.

Then, conventionally, an invention has been proposed in the Japanese Published Unexamined Patent Application No. SHO 61(1986)-276134 wherein in comparing the tracking error signal $S_1$ during a track jump with the reference level $V_R$, the time T of acceleration or deceleration is adjusted in view of the peak value thereof.

As in the case of adjusting the time T of acceleration or deceleration based on the comparison of the above-mentioned tracking error signal $S_1$ with the reference level $V_R$, the track jumping apparatus of the previous publication changes the jump signal $S_2$ to the deceleration signal when the tracking error signal $S_1$ intersects the reference level $V_R$, and thereby obtains an optimum time T of acceleration or deceleration. These waveforms are illustrated graphically in FIG. 8. Note that, at this optimum time T in view of the level change in the tracking error signal $S_1$, the reference level $V_R$ is set so that the ratio of the reference level $V_R$ to a peak value $V_P$ of this tracking error signal $S_1$ is constant.

Figure 8:
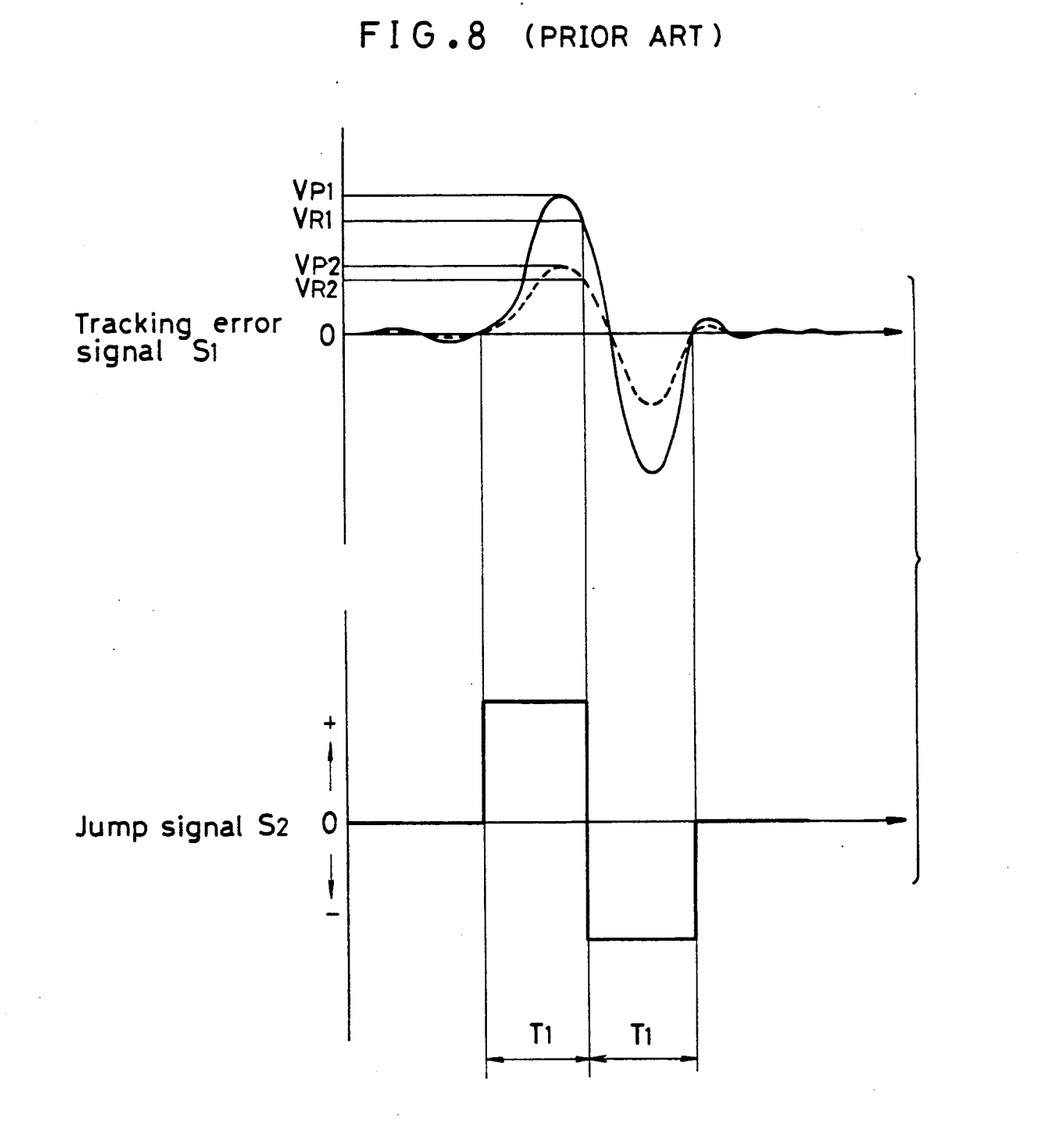
FIG. 8 is a chart showing waveforms of the tracking error signal and the jump signal when there is a change from one level to another.

This means that, as shown by the waveforms and lines shown in FIG. 8, taking a reference level for a peak value $V_{P1}$ of the standard tracking error signal $S_1$, when a stable track jump is performed as $V_{R1}$, where the actual tracking error signal $S_1$ is reduced in level as shown by the broken line, a reference level $V_{R2}$ is set so as to maintain the relation $V_{R1}/V_{P1} = V_{R2}/V_{P2}$ for a peak value $V_{P2}$ at that time. Accordingly, the jump signal $S_2$ maintains a constant time $T_1$ of acceleration or deceleration even when such a level change takes place and therefore a stable track jump is nonetheless performed.

However, such a tracking jumping apparatus has a problem in that an optimum time T of acceleration or deceleration cannot be obtained when there is an off-set (asymmetry) which takes place in the tracking error signal $S_1$. An off-set series of waveforms is also shown in FIG. 9.

Figure 9:
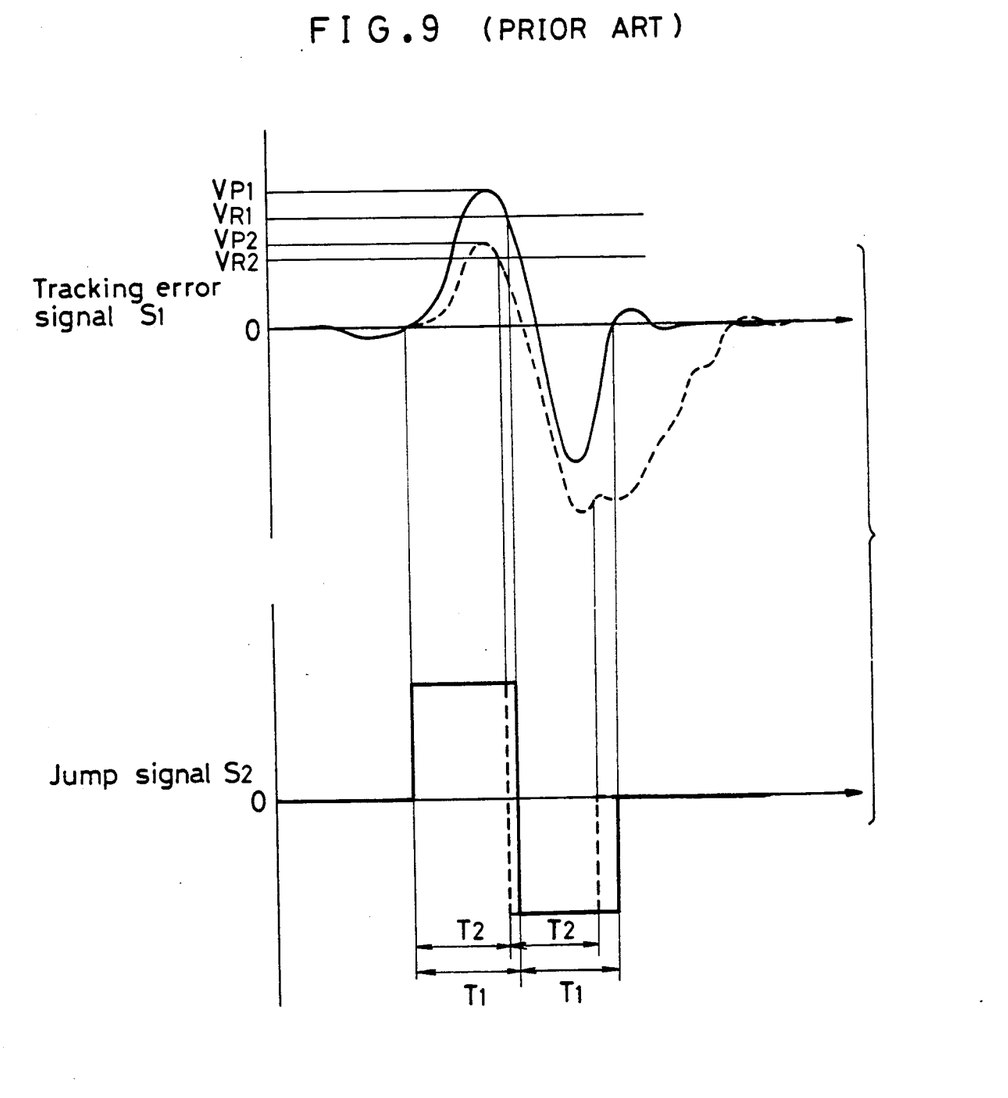
FIG. 9 is a timing chart showing waveforms of the tracking error signal and the jump signal when an off-set change takes place.

The off-set condition shown in FIG. 9 occurs when an inversion for the quantity of error is made at an early timing as shown by a broken line compared with the standard tracking error $S_1$ which is shown by a solid line. Also in this case, the track jumping apparatus of the previous publication sets the reference level $V_{R2}$ for the peak value $V_{P2}$ so that $V_{R2}/V_{P2}$ is equal to $V_{R1}/V_{P1}$ in the instance where the tracking error signal $S_1$ is shown by a solid line, and therefore the time T of acceleration or deceleration becomes $T_2$ which is shorter than $T_1$ the optimum which was determined originally, and a full track jump is not performed, and the apparatus undershoots the jump between tracks. Accordingly, if the servo loop is closed when the quantity of error of the tracking error signal $S_1$ is still large, a time period is required to recover the tracking. It is obvious that also in the instance where an off-set of the delayed inversion has taken place in the tracking error signal $S_1$, time is required to recover the tracking because of overshooting the jump between tracks.

In performing the actual track jump, for example, the jump to an inner circumferential side and the jump to an outer circumferential side in the case of a circular optical disk storage device differ from each other in the waveform patterns formed, and particularly at the position of inversion of the standard tracking error signal $S_1$. In addition, the above description primarily concerns the case where the jump is over only one single track. However, in the case where jumping occurs over multiple tracks, each standard tracking error signal $S_1$ also differs in its wave-form pattern.

Accordingly, there has been a problem in trying to determine the time T of acceleration or deceleration using the same base for these various track jumps and optimum control of each jump becomes impossible.

The object of the present invention is to overcome the above-mentioned problems, by providing a track jumping apparatus for an optical disk pickup, which can set the reference level based on the peak value of the tracking error signal using a standard value which varies depending on the kind of track jump, and can amend this standard value according to the state of tracking error signal at the end of track jump.

SUMMARY OF THE INVENTION

The present invention provides a track jumping apparatus for an optical disk pickup which can detect a tracking error signal in performing a track jump, and determine a time of acceleration or deceleration of a jump signal by comparing the tracking error signal to a reference level, and further provides storing means for storing a standard value corresponding to kinds of track jumps, standard value selecting means for selecting a standard value corresponding to a kind of track jump in performing the track jump, reference level setting means for setting a reference level so that the ratio of the peak value of the tracking error signal to the reference level equals the value based on the standard value selected by the standard value selecting means in performing the track jump, and standard value amending means for amending the standard value of the storing means selected at that moment according to a state of the tracking error signal at the end of the track jump.

BRIEF DESCRIPTION OF THE DRAWINGS

FIG. 1 through FIG. 6 shows one embodiment in accordance with the present invention.

FIG. 7 through FIG. 9 shows the waveforms proceed by a conventional (prior art) device.

DETAILED DESCRIPTION OF PREFERRED EMBODIMENT

A track jumping apparatus for an optical disk pickup of the present invention is typically a portion of a recording/reproducing apparatus for an optical disk. An optical disc is understood to be a disc-shaped medium having tracks on which information is recorded in a coded form capable of being read through optical means and decoded.

The track jumping apparatus is used such that it is connected to a tracking servo loop in the optical disk recording/reproducing apparatus. The tracking servo loops having a configuration which is commonly known in the appropriate field, can be used.

Storing means, standard value setting means for setting standard values for the signals herein as further defined below and a part of standard value amending means in the present invention may be accomplished using a microcomputer. The microcomputer to be used herein comprises an input unit, an output unit, a central processing unit and a storing unit (which are the basic elements of a computer). Of these elements at least the central processing unit (CPU) should have one or several chips.

The storing unit comprises a ROM and RAM as storing means, and a multiplicity of standard values are stored in the RAM.

Then, when a track jump is performed, the central processing unit, as the standard value selecting means, selects a standard value corresponding to the kind of track jump. Kinds of track jumps include the numbers of tracks jumped over at one time, or whether the jump is made to the inner circumferential side or to the outer circumferential side in the case of the optical disk or the like.

The track jump is performed by sending a jump signal to a tracking actuator of the optical disk pickup. The jump signal applies an acceleration signal and a deceleration signal to the tracking actuator for the same time of acceleration or deceleration. The time of acceleration or deceleration is determined by a period of time from the start of a track jump caused by application of the acceleration signal until there is an intersection of the tracking error signal with a reference level at which point the tracking error signal increases once and then subsequently decreases.

Also, in the case where the above-mentioned tracking error signal increases to the reference level, the reference level is set so that the ratio of the peak value agrees with the standard value selected at that moment. The standard value is based on a value corresponding to the ratio of the peak value of the standard tracking error signal depending on the kind of track jump to the reference level.

Accordingly, the present invention can perform a stable track jump without being affected by a level change in the tracking error signal. Also, the effect wherein the waveform pattern of the tracking error signal differs depending on the kind of track jump can be eliminated.

When the track jump is completed as mentioned above, the standard value amending means amends the standard value of the storing means selected at that time according to the state of the tracking error signal at that time. This means that in the case where there is overshooting of the track jump, the standard value is amended so that the value of the reference level to e set is increased and the time of acceleration or deceleration is shortened. Also, in the case of undershooting the track jump, the standard value is amended so that the value of the reference level to be set is decreased and the period of time required for acceleration or deceleration is extended. The standard value thus amended is selected when the same kind of track jump is performed in subsequent operations, and is used for setting of the reference level by the reference level setting means.

Accordingly, the track jumping apparatus of the present invention can responsively amend the time of acceleration or deceleration of the subsequent track jumps to an optimum value even when an off-set change takes place in addition to a change of level in the above-mentioned tracking error signal and a difference in the kind of required track jump.

In addition, generally an equation of motion of the tracking actuator is expressed as follows:

$$m(d^2x/dt^2) + \mu(dx/dt) + kx = F$$

where
- m: Mas of moving part (the objective lens and the like)
- x: Amount of displacement from neutral position
- $\mu$: Mechanical resistance
- k: Constant of control in the spring
- F: Driving force by signals of acceleration and deceleration Then, when the tracking servo loop is normally closed, the amount x of displacement from the neutral position becomes a value near zero. When the servo loop is opened, the term kx can be neglected. However, when track jumps are repeated consecutively in a short time, the tracking actuator is moved sometimes into a state other than the neutral position depending on the ability of the carriage to follow. In such a case, the term kx cannot be neglected, and therefore a normal jump cannot be performed due to different characteristics of the tracking actuator even when the track jump is performed based on the standard value stored in the storing means. Accordingly, in this case, the amendment at the end of jump is not executed unlike the jump in the state that the tracking actuator is normal, and the standard value corresponding to such a case may have to be readjusted.

Hereinafter, description is made of one embodiment in accordance with the present invention based on FIG. 1 through FIG. 6.

This embodiment shows a track jumping apparatus for an optical disk pickup in an optical disk recording/reproducing apparatus.

(a) Tracking servo loop

Figure 1:
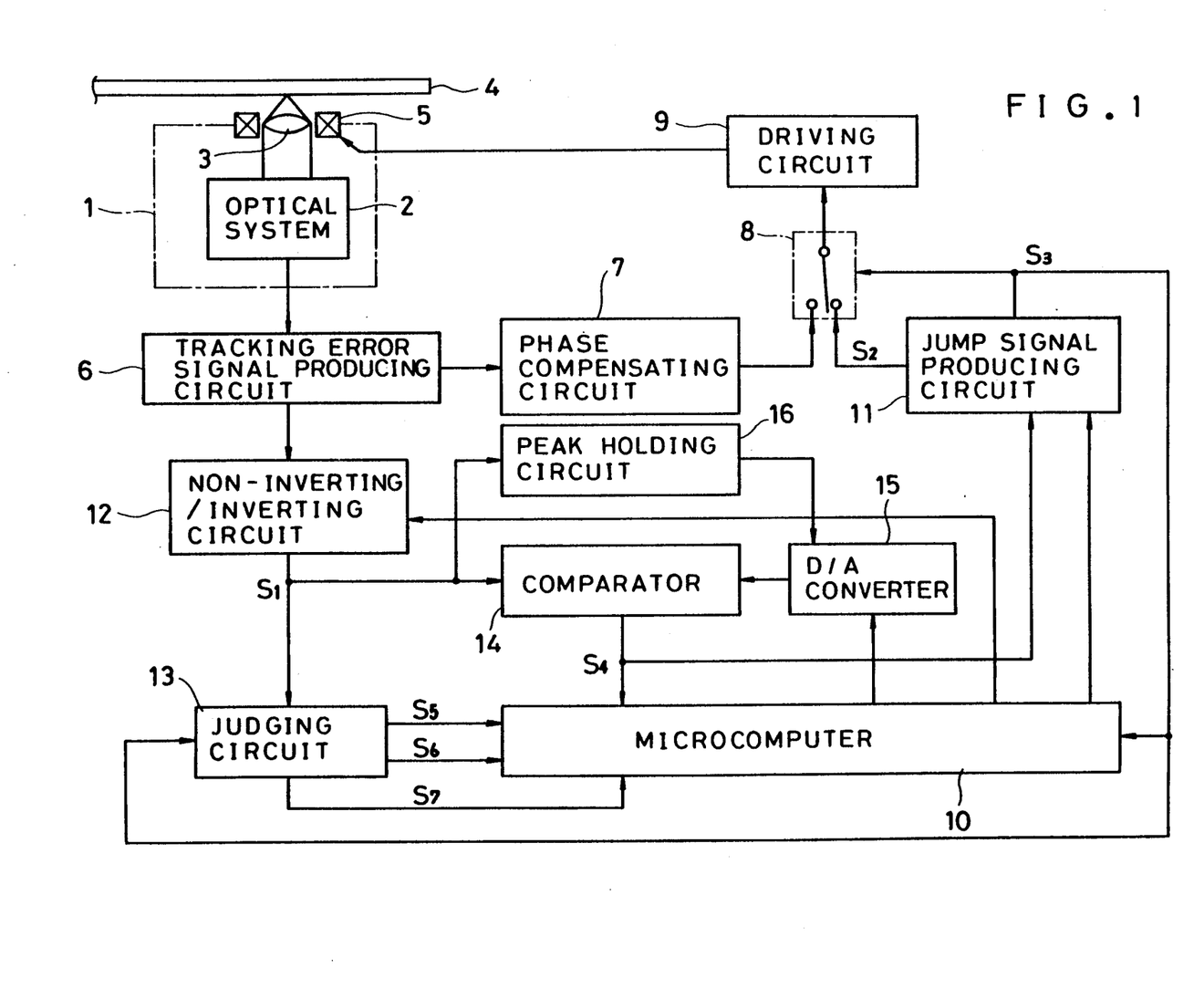
FIG. 1 is a block diagram of a track jumping apparatus.

As shown in FIG. 1, an optical disk pickup 1 positioned such that a laser beam emitted from an optical system 2 is irradiated onto an optical disk 4 through an objective lens 3. The optical system 2 irradiates the laser beam onto the optical disk 4, and receives the light reflected from the optical disk 4, converting it into an electric signal. Also, the optical disk pickup 1 is provided with a tracking actuator 5 for performing tracking servo control and track jumping by moving the objective lens 3 and the optical disk pickup 1.

The electric signal from the optical system 2 in the optical disk pickup 1 is sent to a tracking error signal producing circuit 6. The tracking error signal producing circuit 6 produces a tracking error signal, for example, by the push-pull method. The tracking error signal phase is compensated with a phase compensating circuit 7, which sends its signal to a driving circuit 9 through an analog switch 8. The driving circuit 9 drives the tracking actuator 5 in response to this tracking error signal, thereby forming a tracking servo loop.

(b) Track Jumping Apparatus

When the optical disk pickup 1 performs a track jump, a jump signal producing circuit 11 outputs a jump signal $S_2$ based on instructions from a microcomputer 10, and the gate control signal $S_3$ is turned to "LOW". When the gate control signal $S_3$ becomes "LOW", the analog switch 8 is changed over to the jump signal producing circuit 11 as shown in FIG. 1, and the tracking servo loop is opened. Accordingly, the jump signal $S_2$ from the jump signal producing circuit 11 is input to the above-mentioned driving circuit 9 through the analog switch 8. The jump signal $S_2$ as produced by jump signal producing circuit 11 has pulses of equal level and opposite polarities for the same period continuously or at constant time intervals, such that an acceleration signal is issued first, and thereafter followed by a deceleration signal. Accordingly, the jump signal producing circuit 11 produces jump signal $S_2$ with a first acceleration component which is directed to the driving circuit 9. Then, the driving circuit 9 can cause a track jump by driving the tracking actuator 5.

The tracking error signal produced by the tracking error signal producing circuit 6 during the period of track jump is sent to a judging circuit 13 and a comparator 14 through a non-inverting/inverting circuit 12. The non-inverting/inverting circuit 12 is a circuit which outputs the tracking error signal $S_1$ such that the quantity of error of the positive side always increases first irrespective of the direction of track jump by inverting the tracking error signal from the tracking error signal producing circuit 6 when the direction of the track jump is either to the inner circumferential side or to the outer circumferential side of the optical disk 4.

A peak holding circuit 16 first detects and holds a peak value increasing to the positive side of the tracking error signal $S_1$. The detected peak value is sent to a reference input of a multiplying D/A converter 15, and a product of the peak value and a standard value from the microcomputer 10 is calculated.

The standard value is a value stored in the RAM of the microcomputer 10. As shown in the following Tables 1 and 2, two kinds of tables are provided in RAM; a first table which is used when performing a normal track jump which jumps over a predetermined number of tracks in a one-time operation during one rotation of the optical disk, and a second table which is used when performing a continuous jump during one rotation of the optical disk and over a predetermined number of tracks. Also, the standard values preset in each table are separated depending upon whether the track jump is to the inner circumferential side or to the outer circumferential side, and are further separated by the number of tracks jumped over. Thus the respective standard values are stored in a two-dimensional arrangement. For these standard values, the ratio of the reference level $V_R$ of the standard tracking error signal $S_1$ to the peak value $V_P$ becomes a base for determining each kind of track jump. Note that these standard values, as described later, undergo amendment, i.e. they are updated in correspondence with changes in the characteristics of the tracking actuator 5 or the like, thereby revealing a system that, through feedback, constantly updates its standard values making them more accurate.

TABLE 1

| | The First Table | |
|---|---|---|
| Number of | Direction of Jump | |
| tracks to be jumped over | To inner circumferential side | To outer circumferential side |
| 1 | Standard value 1F | Standard value 1B |
| 2 | Standard value 2F | Standard value 2B |
| 3 | Standard value 3F | Standard value 3B |
| — | — | — |
| n | Standard value nF | Standard value nB |

TABLE 2

| | The Second Table | |
|---|---|---|
| Number of | Direction of Jump | |
| tracks to be jumped over | To inner circumferential side | To outer circumferential side |
| 1 | Standard value 1F' | Standard value 1B' |
| 2 | Standard value 2F' | Standard value 2B' |
| 3 | Standard value 3F' | Standard value 3B' |
| — | — | — |
| n | Standard value nF' | Standard value nB' |

The microcomputer 10 selects one of the standard values from either of these tables according to the kind of track jump that is to be initiated. In the case of, e.g. a continuous jump, the microcomputer 10 first selects the second table. In the case of, e.g., a normal track jump, the microcomputer 10 selects the first table. In the case of the continuous jump, the track jump step is repeated a number of times in a short period of time, and therefore when each jump is performed the tracking actuator 5 is out of its neutral position. This kind of jump differs considerably in its characteristics from that of a single jump. For this reason, it is important to amend or modify the standard value for the continuous jump separately from the normal jump, and this results in the need for and provision of two kinds of tables. Also, taking the number of tracks to be jumped over as $m(1---n)$ and the direction of jump as $D(F, B)$, the microcomputer 10 selects a standard value to become the elements of $[m:D]$ in the two-dimensional array of each table. If the direction of the jump or the number of tracks to be jumped over differs, the characteristics of each individual jump differs. Accordingly, amendment of the standard value for a different kind of jump caused by execution of any track jump is avoided. In other words, the standard value can be set according to each kind of track jump, and therefore a suitable jump can be performed without being affected by the waveform pattern of the tracking error signal $S_1$ which may differ for each kind of track jump. Also, the multiplying D/A converter 15 calculates the reference level $V_R$ by multiplying the standard value selected by the microcomputer 10 from the stored tables by the peak value $V_P$ sent from the peak holding circuit 16. Accordingly, the reference level $V_R$ responding to the peak value $V_P$ at that time is set even when a level change takes place in the tracking error signal $S_1$, and therefore a stable track jump can be performed without being affected by this level change.

The reference level $V_R$ calculated by the multiplying D/A converter 15 (which is based on the standard value selected by the microcomputer 10), is sent to the above-mentioned comparator 14. The comparator 14 compares the tracking error signal $S_1$ after having reached the peak value $V_P$ with the reference level $V_R$ from the multiplying D/A converter 15, and outputs a signal $S_4$ to the above-mentioned jump signal producing circuit 11 and the microcomputer 10 at the moment when the tracking error signal $S_1$ intersects with the reference level $V_R$.

The jump signal producing circuit 11 receives the signal $S_4$ from the comparator 14, and stops the acceleration signal of the jump signal $S_2$. Also, when the track jump at this time is a jump over one track, the jump signal $S_2$ is further inverted to form the deceleration signal as in the case of the prior art device shown in FIG. 8. Where the track jump is a jump over multiple tracks, the comparator 14 successively detects intersections of the tracking error signal $S_1$ and the reference level $V_R$. The microcomputer 10 counts the number of tracks to be jumped over by counting the signal $S_4$. Then, when a predetermined number of times m is counted, a signal is output to the jump signal producing circuit 11, which changes the jump signal $S_2$ from its indicated stopped positions to the deceleration signal. Also, the microcomputer 10 counts the time of application of the acceleration signal in the above-described jump signal $S_2$ as the time T of acceleration or deceleration irrespective of the number of jumps, and when the time T of acceleration or deceleration has elapsed from the issue of the deceleration signal, outputs a signal to the jump signal producing circuit 11 to stop this deceleration signal, the jump signal $S_2$ to an end.

Figure 3:
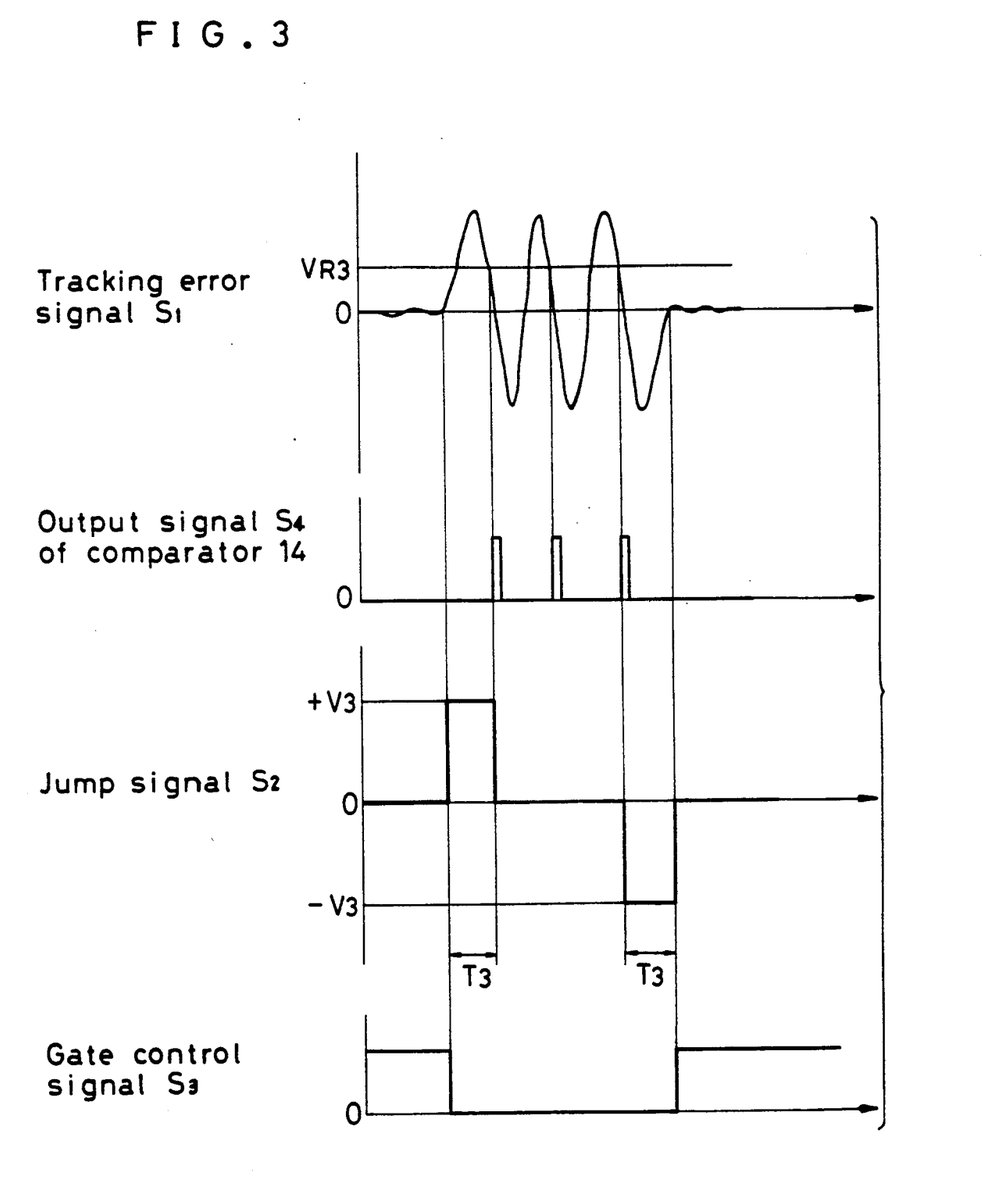
FIG. 3 is a timing chart showing waveforms of a tracking error signal, a jump signal and the like when a jump over multiple tracks is performed.

In order to facilitate greater comprehension of the invention, the following example is provided for a jump over three tracks. When the gate control signal $S_3$ switches to "LOW", the jump signal $S_2$ simultaneously becomes the acceleration signal of $+V_3$. Then, when the tracking error signal $S_1$ reaches a peak value once and thereafter intersects with a reference level $V_{R3}$, the output signal $S_4$ of the comparator 14 is output in an impulse fashion. When the first signal $S_4$ is output, the acceleration signal of the jump signal $S_2$ is stopped, and a time $T_3$ of acceleration or deceleration is counted by the microcomputer 10. In addition, generally the time $T_3$ of acceleration or deceleration must be longer when the number of tracks to be jumped over is increased. Accordingly, the reference level $V_{R3}$ must also be lower as the number of tracks to be jumped over increases, and each standard value is set in such a manner. When the jump signal $S_2$ is stopped after the acceleration signal, the optical disk pickup 1 is moved by inertia, and therefore the tracking error signal $S_1$ also repeats a similar pattern at every movement between tracks. During this process, the microcomputer 10 counts the output signal $S_4$ of the comparator 14, and on receiving the third signal $S_4$, it converts the jump signal $S_2$ into the deceleration signal of $-V_3$. Then, when the signal $S_2$ is applied for the time $T_3$ of acceleration or deceleration, the jump signal producing circuit 11 brings the jump signal $S_2$ to an end, and returns the gate control signal $S_3$ to "HIGH". Then, the tracking servo is restored, and the jump over three tracks is completed.

Accordingly, the track jumping apparatus of the embodiment sets the reference level $V_R$ based on the standard value selected from the first table or the second table and the peak value $V_P$ at that time, and performs a predetermined track jump.

(c) The Judging Circuit 13

Figure 2:
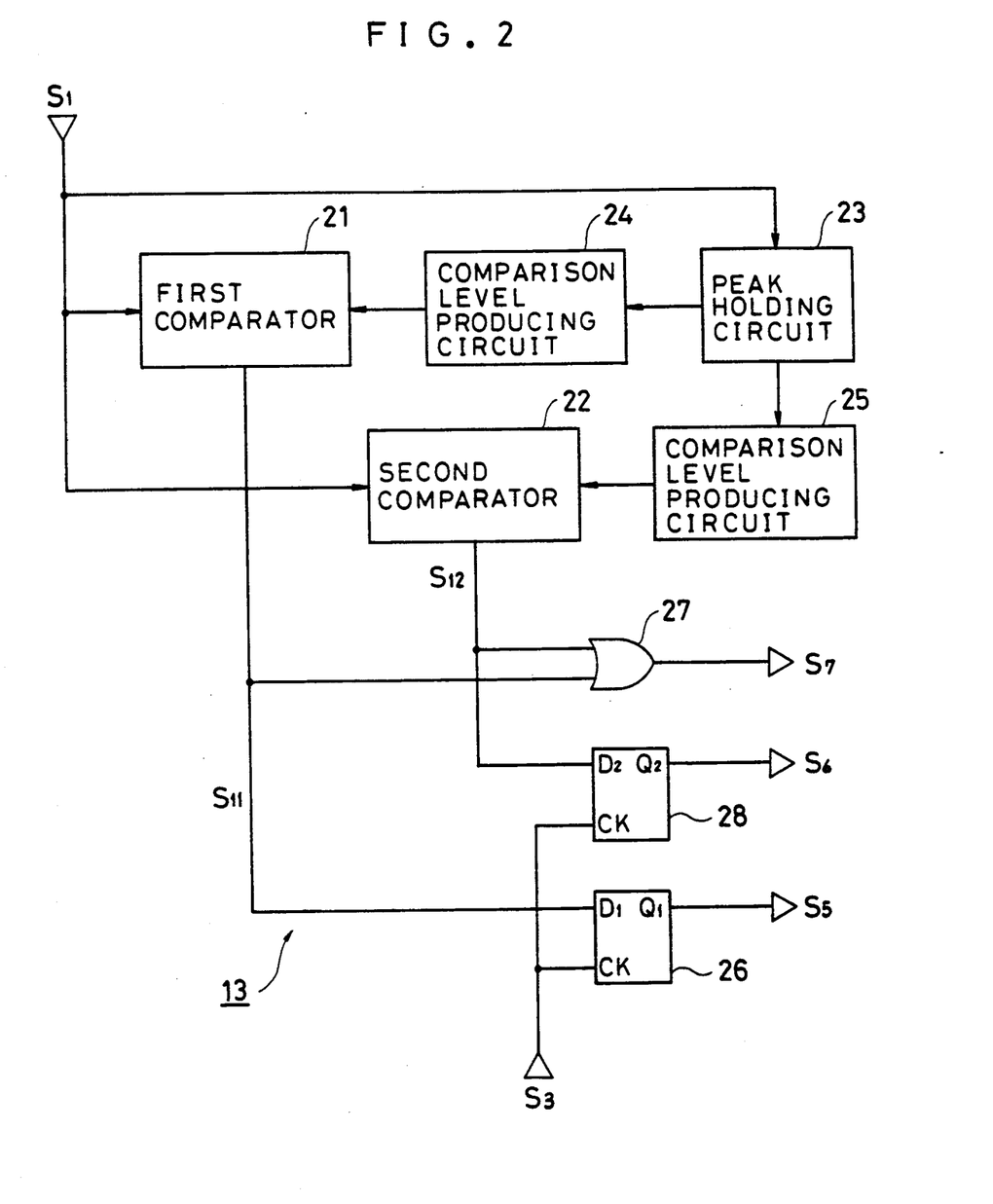
FIG. 2 is a block diagram of a judging circuit.

The gate control signal $S_3$ from the jump signal producing circuit 11 is also inputted to the above-mentioned judging circuit 13, in addition to the tracking error signal $S_1$ from the non-inverting/inverting circuit 12. The judging circuit 13, as shown in FIG. 2, inputs the tracking error signal $S_1$ to a first comparator 21, a second comparator 22 and a peak holding circuit 23.

The peak holding circuit 23 detects positive and negative peak values of the tracking error signal $S_1$, and these peak values are sent to comparison level producing circuits 24 and 25. The comparison level producing circuit 24 produces a comparison level $V_H$ as a comparison signal based on the positive peak value, and sends it to the first comparator 21. This comparison level $V_H$ is a value which is based on the peak value in between the positive peak value and the zero level in the tracking error signal $S_1$. The first comparator 21 compares the comparison level $V_H$ with the tracking error signal $S_1$, and outputs a signal $S_{11}$ which switches to "HIGH" when the tracking error signal $S_1$ exceeds the comparison level $V_H$. Also, the comparison level producing circuit 25 produces a comparison level $V_L$ as a comparison signal based on the negative peak value, and sends it to the second comparator 22. The comparison level $V_L$ has a negative value produced by inverting the above-mentioned comparison level $V_H$. The second comparator 22 compares the comparison level $V_L$ with the tracking error signal $S_1$, and outputs a signal $S_{12}$ which switches to "HIGH" when the tracking error signal $S_1$ becomes negative relative to the comparison level $V_L$.

In addition, under an alternative embodiment, these comparison level $V_H$ and $V_L$ are not produced by the peak holding circuit 23 and the comparison level producing circuits 24 and 25 as mentioned above, but are constant reference voltages set in advance.

The signal $S_{11}$ from the first comparator 21 is sent to a $D_1$ input of a first FF (flip-flop) circuit 26 and one of input of an OR circuit 27. The first FF circuit 26 is a D-type flip-flop, which inputs the above-mentioned gate control signal $S_3$ to a clock input CK, and latches the signal $S_{11}$ at a rise to "HIGH" of the gate control signal $S_3$, and thereby outputs a signal $S_5$ from a $Q_1$ output. Accordingly, when the signal $S_5$ is "HIGH", the tracking error signal $S_1$ exceeds the comparison level $V_H$ at the end of track jump, and therefore the state of overshooting the jump can be detected.

Also, the signal $S_{12}$ from the second comparator 22 is sent to a $D_2$ input of a second FF (flip-flop) circuit 28 and the other input of the OR circuit 27. The second FF circuit 28 is also a D-type flip-flop, which inputs the gate control signal $S_3$ likewise to the clock input CK, and latches the signal $S_{12}$ at a rise to "HIGH" of the gate control signal $S_3$, and thereby outputs a signal $S_6$ from a $Q_2$ output. Accordingly, when the signal $S_6$ is "HIGH", the tracking error signal $S_1$ is negative relative to the comparison level $V_L$ the track jump, and therefore the state of undershooting the jump can be detected.

The OR circuit 27 is a circuit which does a logical sum of the signals $S_{11}$ and $S_{12}$, and outputs it as a signal $S_7$. Accordingly, when the signal $S_7$ is "HIGH", the value of the tracking error signal $S_1$ exceeds the range between the comparison level $V_L$ and the comparison level $V_H$, and the abnormal state of the tracking servo can be detected.

The signals $S_5$ and $S_6$ outputted from the judging circuit 13, as shown in FIG. 1, are sent to the microcomputer 10. Then, on receiving the signal $S_5$ at the end of track jump the microcomputer 10 which also functions as an amending circuit makes an amendment by slightly increasing the standard value selected at that moment thereby creating an amended standard value swapping the amended value with the original standard value in the appropriate table in the RAM. The amended standard value is thereby created by adding the incremental increase to the selected standard value. This amended standard value is stored in the RAM of the microcomputer 19 as a new standard value. Accordingly, when the same kind of track jump is performed again, the amended standard value is selected (looking like a standard value), and therefore, the time T of acceleration or deceleration is shortened, and overshooting of the jump is corrected. Also, on receiving the signal $S_6$ at the end of track jump, the microcomputer 10 makes an amendment by slightly incrementally decreasing the value of the standard value selected at the time thereby creating an amended standard value which is swapped with the original standard value in the appropriate table in the RAM. This amendment is performed by subtracting the incremental value of amendment set in advance from the selected standard value. The amended standard value is swapped with the standard value originally stored in the RAM of the microcomputer 10. Accordingly, when the same kind of track jump is again performed, this new (amended) standard value is selected, and therefore, the time T of acceleration is extended, and undershooting of the jump is corrected.

Also, in performing a track jump, if the signal $S_7$ from the judging circuit 13 is "HIGH", the microcomputer 10 delays start of this track jump until the tracking servo is restored. This delay occurs because, in any abnormal state of the tracking error signal $S_1$, no normal track jump can be performed by using a standard value.

(d) Operation of the judging circuit 13

Figure 4A:
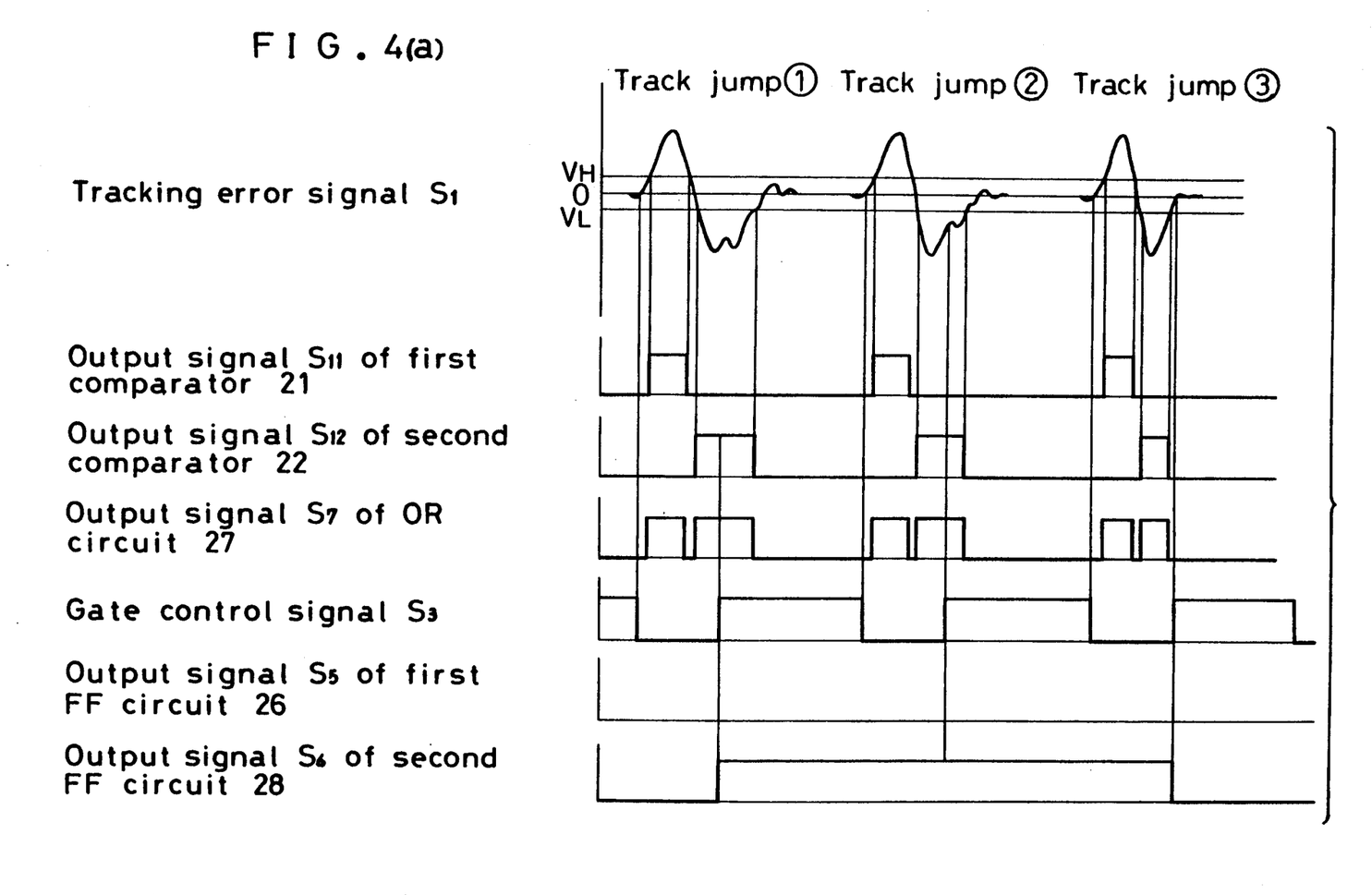
FIG. 4(a) is a timing chart showing waveforms of the tracking error signal and the like when an off-set change of early timing of inversion takes place.
Figure 4B:
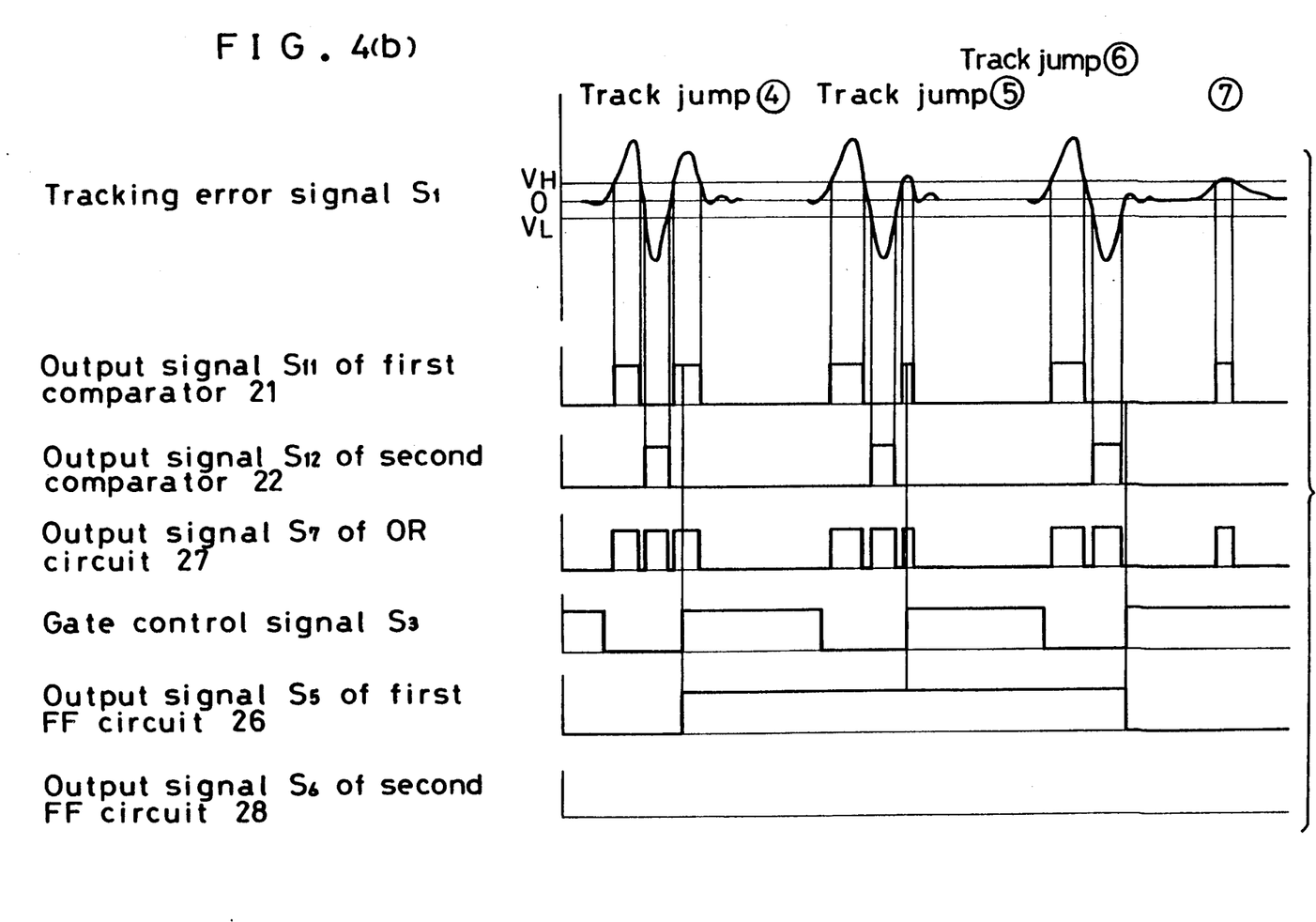
FIG. 4(b) is a timing chart showing waveforms of the tracking error signal and the like when an off-set change or delayed timing of inversion takes place.

FIG. 4 shows an operation by the judging circuit 13 when an off-set takes place in the tracking error signal $S_1$. For the sake of simplification, only the instance of a jump over one track is shown. However one skilled in the art will from the description and the teachings contained herein, be capable of utilizing the invention for multiple jumps which are well within its scope.

First, FIGS. 4(a) and 4(b) show the methodology by which the instant invention "learns", i.e. improves based upon previous track jumps. In particular, FIG. 4(a) shows the case of an off-set, wherein the tracking error signal $S_1$ indicates that inversion has occurred at a moment which is too early in order to obtain optimal track alignment. If this off-set takes place for the first time in performing the initial track jump ①, since the reference level is set based on the standard value which takes no off-set into consideration, the time T of acceleration or deceleration is insufficient, resulting in undershooting the jump. For this reason, the tracking error signal $S_1$ becomes lower than the comparison level $V_L$ at the end of jump when the gate control signal $S_3$ returns to "HIGH", and therefore "HIGH" of the output signal $S_{12}$ of the second comparator 22 is latched by the second FF circuit 28, and the output signal $S_6$ goes "HIGH". Accordingly, based on this signal $S_6$, the microcomputer 10 makes an amendment by slightly decreasing the standard value selected at that moment, and returns this to the original table. Then, when the same kind of track jump ② is performed again, this time, the reference level is set based on the amended standard value, and therefore undershooting the jump is compensated to some extent. However, in the drawing, the tracking error signal $S_1$ is still lower than the comparison level $V_L$ at the end of jump, and therefore the output signal $S_6$ from the second FF circuit 28 still maintains its "HIGH" level. In addition, even when another kind of jump is performed between these track jumps ① and ② and the signal $S_6$ returns to "LOW" once, the subsequent process control operations are the same because the signal $S_6$ goes "HIGH" again. Then, based on the signal $S_6$, the microcomputer 10 makes an amendment by slightly decreasing the standard value again. Thereafter, the same kind of track jump ③ is further performed, the effect of the off-set is completely eliminated two amendments, and the tracking error signal $S_1$ is approximately zero at the end of jump. Accordingly, the signal $S_6$ is also restored to "LOW", and a stable track jump thereafter repeatedly can be performed.

Next, FIG. 4(b) shows the case of an off-set wherein the tracking error signal $S_1$ is inverted because of a delay in timing. In performing a track jump ④, if this off-set takes place for the first time, the reference level is set based on the standard value taking no off-set into consideration, and therefore the time T of acceleration or deceleration is extended, resulting in overshooting the jump. For this reason, the tracking error signal $S_1$ is already higher than the comparison level $V_H$ at the end of jump when the gate control signal $S_3$ returns to "HIGH", and therefore "HIGH" of the output signal $S_{11}$ of the first comparator 21 is latched by the first FF circuit 26, and the output signal $s_6$ switches "HIGH". Accordingly, based on the signal $S_5$, the microcomputer 10 makes an amendment by slightly increasing the standard value selected at that moment, returning it to the RAM. Then, when the same kind of track jump ⑤ is performed again, this time the reference level is set based on the amended standard value, and therefore overshooting the jump is compensated to some extent. However, in the drawing, the tracking error signal $S_1$ is still higher than the comparison level $V_H$ at the end of jump, and therefore the output signal $S_5$ from the first FF circuit 26 still maintains its "HIGH" level. Then, based on the signal $S_5$, the microcomputer 10 makes an amendment by slightly increasing the standard value again. Thereafter, when the same kind of track jump ⑥ is performed again, the effect of the off-set is completely eliminated by the previous two amendments, and the tracking error signal $S_1$ is nearly zero at the end of jump. Accordingly, the signal $S_5$ is also restored to "LOW", and a stable track jump can thereafter be repeatedly performed.

In addition, time period ⑦ in FIG. 4(b) shows the case where, for various reasons, the tracking error signal $S_1$ exceeds the comparison level $V_H$, and consequently the output signal $S_{11}$ of the first comparator 21 goes "HIGH", and the output signal $S_7$ of the OR circuit 27 also goes "HIGH". When a track jump is initiated in such a case, a stable jump cannot be performed, and therefore when the microcomputer 10 receives the signal $S_7$, a jump is delayed until the tracking servo is stabilized.

(e) Operation of the Track Jumping Apparatus

Figure 5A:
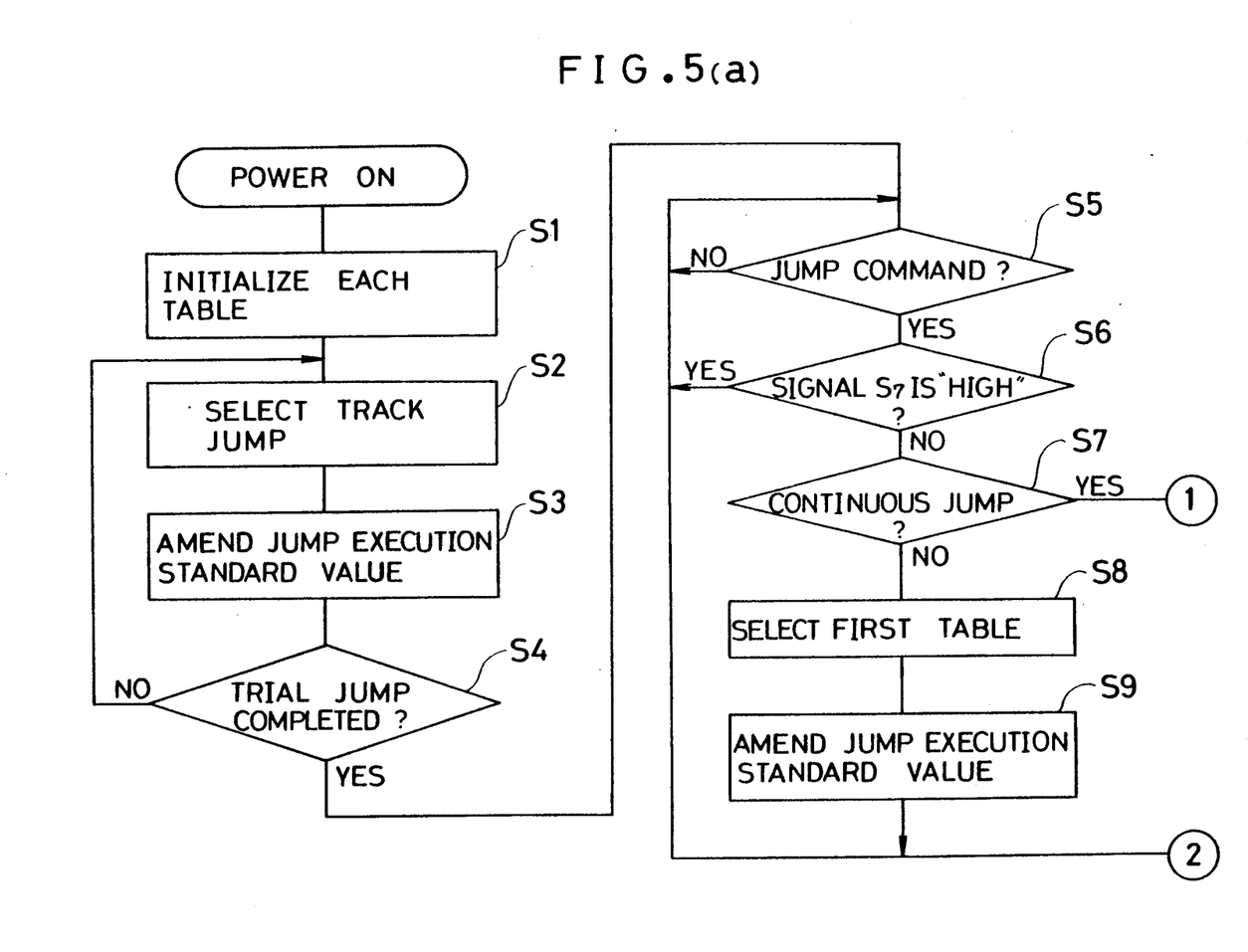
FIGS. 5(a) and 5(b) are flowcharts showing operation of the track jumping apparatus.
Figure 5B:
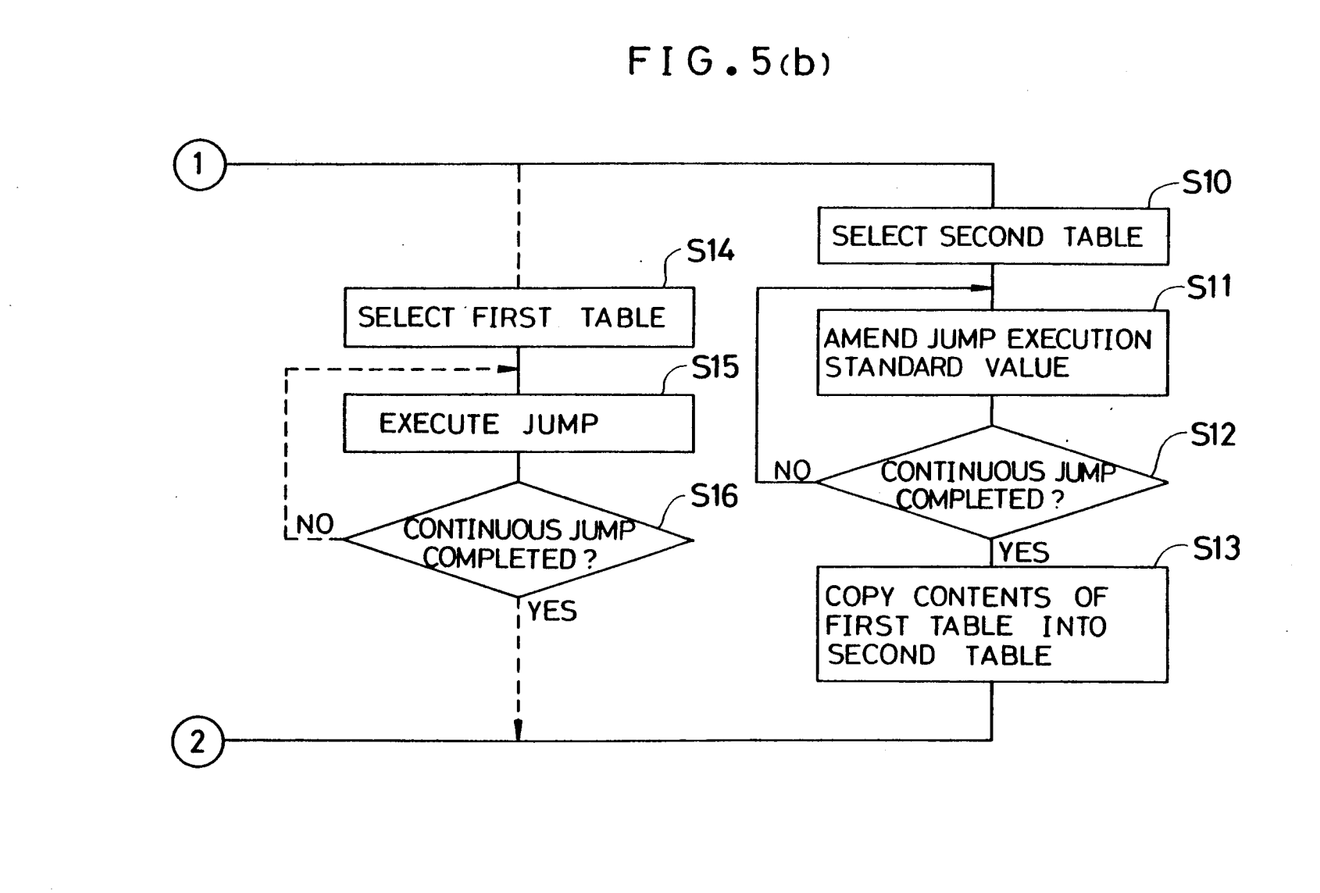
Figure 6:
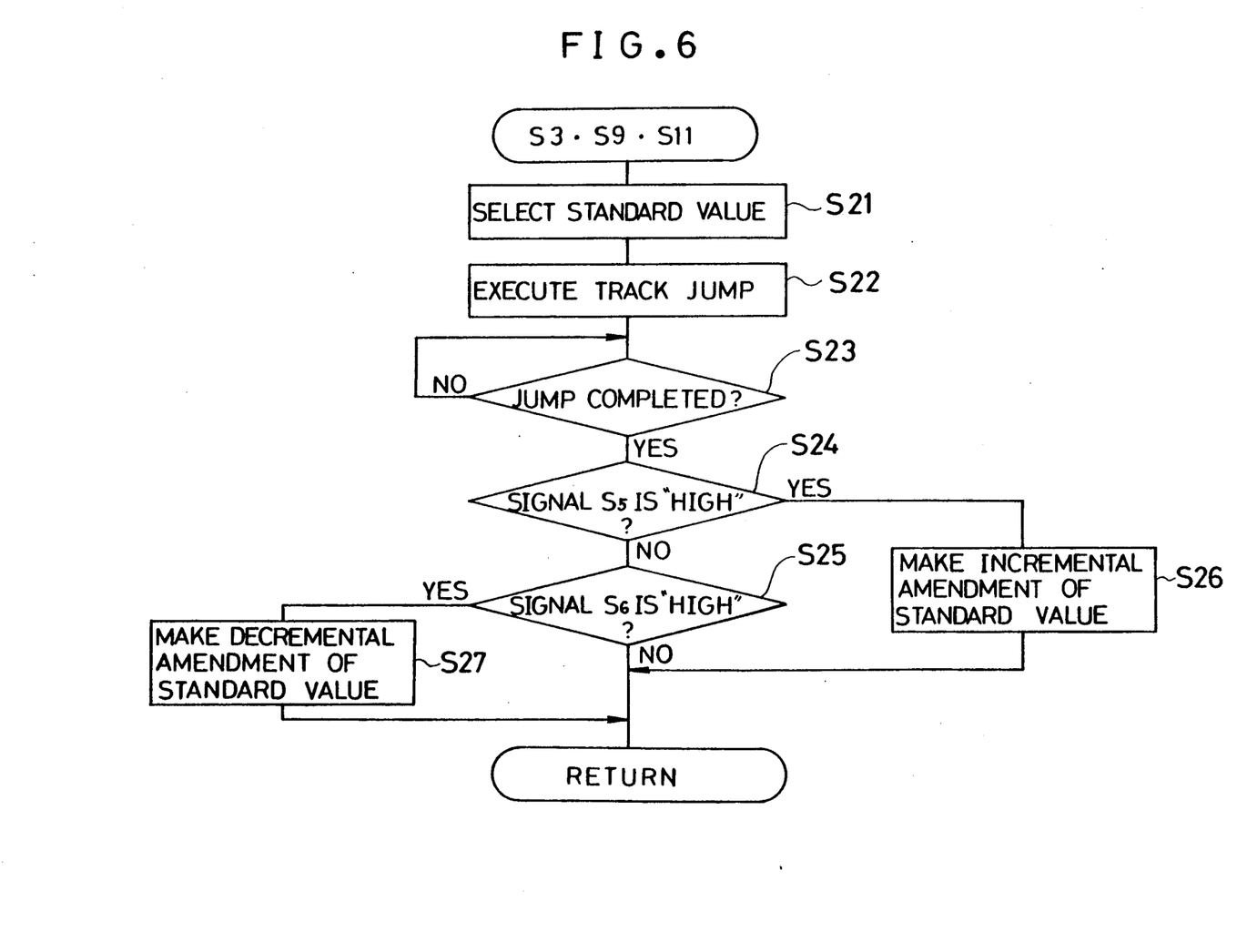
FIG. 6 is a flowchart showing processing steps used to execute track jumping and to amend the standard value.

The following is a description of the operation of the track jumping apparatus based on flowcharts in FIG. 5(a), FIG. 5(b) and FIG. 6.

First, as shown in FIG. 5(a), when the power supply of the apparatus is turned to ON, in step (hereinafter referred to as "S" 1, the initial value of the first table and the second table in the RAM are set. This initial value is stored in the ROM, and is a value determined by taking the ratio of the peak value $V_P$ of the standard tracking error signal $S_1$ in each kind of track jump to the reference level $V_R$ as a base as described above. Then, this value is empirically evaluated for each track jump, and otherwise can be evaluated by adding in increment according to the kind of jump, to the value for the track jump. When the setting of the initial value is completed, a trial jump is performed automatically for each kind of track jump (S2-S4). In this trial jump, each kind of track jump is automatically selected in sequence (S2) and this jump is executed, and an amendment of the standard value selected at that time is performed (S3). Then, judgment is made on whether or not the trial jump has been completed (S4), and when it has not been completed, processing returns to S2, and repeats the trial jump again. The following is a description of the steps in executing a track jump and processing by amending the standard value (S3) based on FIG. 6.

First, the standard value corresponding to the kind of track jump is selected from the first table or the second table (S21). Then, when the standard value is selected, that track jump is executed (S22), and processing waits for the completion of the jump (S23). This completion of the jump can be detected when the gate control signal $S_3$ rises to "HIGH". When the track jump ends, the states of the signals $S_5$ and $S_6$ are checked (S24, S25).

In S24, when the signal S5 is detected to be "HIGH", an amendment is made to slightly increase the standard value selected at that time, and this is returned to the original position in the table (S26). When the standard value is increased, the reference level $V_R$ is raised even if the peak value $V_P$ is the same, and therefore, in performing the same subsequent track jumps, overshooting the time T of acceleration or deceleration is shortened, and the jump is corrected. In S25, when the signal S6 is detected to be "HIGH", an amendment is made to slightly decrease the standard value selected at that time, and this is returned to the original position in the table (S27). When the standard value is decreased, the reference level $V_R$ is lowered even if the peak value $V_P$ is the same, and therefore in performing the same subsequent track jumps, undershooting the jump is corrected. When the amendment of the standard value is completed in S26 or S27, processing of S3 is also completed. Also, when it is judged that both of the signals S5 and S6 are "LOW" on S24 and S25, processing of S3 is completed without amending the standard value.

This trial jump is repeated until a stable jump can be performed for each kind of track jump. Accordingly, in FIG. 5(a), when the standard value is amended and processing of S3 is completed, processing returns to S2 from S4 without fail, and in S2, the track jump of the same kind as the preceding jump is selected again. Also, when processing of S3 is completed without undergoing amendment of the standard value, in S4, a decision is made on whether or not the trial jump has been completed for all kinds of track jumps, and when it has not been completed yet, processing returns to s2, and the next kind of track jump is selected.

This trial jump can eliminate the need for an initial adjustment in manufacturing the apparatus. Also, this trial jump is executed on every occasion the power supply is turned on, and therefore processing can accommodate for the secular change of the apparatus. In addition, by making the contents of each table retreat into the S-RAM, backed up when power is turned off or the like, such a trial jump can be omitted.

When the trial jump is completed, processing waits until a command to track jump is issued to the apparatus (S5), and when a jump command is issued, detects the state of the signal $S_7$ (S6). When the signal $S_7$ is "HIGH", the tracking servo is not normal, and therefore processing returns to S5, and waits until the abnormal state is cleared.

When it is determined that the signal $S_7$ is "LOW" and the tracking servo is in its normal state, a decision is made whether or not the commanded track jump is a continuous jump (S7) by determining if the elapsed time from the preceding track jump is within a predetermined time.

When the commanded track jump is a normal jump, the first table is selected (S8), and execution of that track jump and processing of amending the standard value are performed (S9). This processing of S9 has the same content as that of the above-mentioned S3 (FIG. 6) except that selection of the standard value is limited to the first table. When the processing of S9 is completed, processing returns to S5, and waits for another jump command.

In S7, when the commanded track jump is a continuous jump, as shown in FIG. 5(b), the second table is selected (S10) first, and execution of that track jump and processing of amending the standard value is performed (S11). This processing of S11 also has the same content as that of the above-mentioned S3 (FIG. 6) except that the selection of the standard value is limited to the second table. When the processing of S11 is completed, a decision is made on whether or not the continuous jump has been completed (S12), and when it has not been completed, processing returns to S11, and execution of track jump and processing of amending the standard value is performed. Accordingly, in this S12, after completion of the preceding jump, processing waits until the predetermined period of time elapses in S7, and when a jump command is issued during this time, processing returns to S11 assuming that the continuous jump is not yet completed. Then, when no jump command is issued even after the lapse of the predetermined time, it is determined that the continuous jump has been completed. In performing a continuous jump, this processing enables the standard value to follow the characteristics which change with increase in the number of jumps. When the continuous jump has been completed, the content of the first table is copied into that of the second table (S13). This is performed to cancel the standard value which has changed in sequence with an increase in the number of times of the continuous jumps, and thereby when the continuous jump is performed again later, the amendment of the standard value can be started from the initial state. When copying into the second table is finished, processing returns to S5, and waits for another jump command.

In addition, when it is determined that a continuous jump is to occur in S7, it is also possible that as shown by a broken line, the first table is selected (S14) first, subsequently a track jump is executed (S15), and this processing of S15 is repeated (S16) until the continuous jump is completed. Then, in this case, only processing of S22 as shown in FIG. 6 is performed in S15, and amendment of the standard value is not performed. When such processing is performed, the stability in performing the continuous jump is spoiled to some extent, but it has the advantage that we can avoid the situation where the standard value for normal track jump is amended incorrectly by a continuous jump having different characteristics. When this processing is performed, the second table can also be dispensed with.

Accordingly, the track jumping apparatus of the present invention has the characteristics that it can perform a stable track jump without being affected by a level change or an off-set change in the tracking error signal irrespective of the kind of track jump.

What is claimed is:

1. An apparatus for compensating for an error in movement and location of an optical pickup for use in an optical disk track jumping apparatus during track jumping from a first to a second track such that he location of said optical pickup settles in said second track, having as an input a tracking error signal produced by the pickup corresponding to the movement of an optical beam with respect to a track, comprising:

means for supplying standard values, each of which corresponds to a track jump characteristic;

standard value selecting means for selecting a standard value from said means for supplying standard values;

peak signal value determining circuit for receiving the tracking error signal and outputting a peak value of said tracking error signal;

reference level setting means for determining a reference level proportional to said selected standard value and said peak signal value;

comparing means for comparing said tracking error signal with said reference level and outputting a comparator output signal controlling the movement and location of said optical pickup;

standard value updating means for updating the selected standard value in said means for supplying standard values with a value that reduces a period of time required for said optical pickup to settle in said second track.

2. An apparatus in accordance with claim 1, wherein said means for supplying standard values comprises a first table for storing said standard values selected by said standard value selecting means in performing a single track jump and a second table for storing said standard values selected in performing a continuous track jump.

3. An apparatus in accordance with claim 1, wherein said reference level setting means comprises a peak signal value holding circuit which detects and holds a peak value of the tracking error signal, and said reference level setting means comprises a multiplying digital-to-analog converter.

4. An apparatus in accordance with claim 1, wherein said standard value updating means comprises a judging circuit which judges an overshooting or an undershooting of the track jump from the tracking error signal in performing the track jump and outputs a signal corresponding to said overshooting or undershooting, and an updating circuit which updates the selected standard value in said means for supplying standard values with a value that reduces the period of time required for said optical pickup to settle in said second track.

5. An apparatus in accordance with claim 4, wherein said tracking error signal attains positive and negative values, said reference level determines a jump signal having an end, and said judging circuit comprises:

first comparator for comparing a positive comparison signal with a peak signal value of said peak signal value determining means when said tracking error signal attains a positive peak value;

second comparator for comparing a negative comparison signal with a peak signal value of said peak signal value determining means when said tracking error signal attains a negative peak value;

positive comparison signal determining means for determining said positive comparison signal based on said positive peak value of said tracking error signal;

negative comparison signal determining means for determining said negative comparison signal based on said negative peak value of said tracking error signal;

a first flip-flop circuit latching a valued-datum signal outputed from the first comparator when said optical pickup jumps from the first to the second track, and a second flip-flop circuit latching a valued-datum signal outputted from the second comparator at the end of the jump signal, such that when said first flip-flop latches a non-zero valued datum said judging circuit judges an overshoot, and when said second flip-flop latches a non-zero valued datum said judging circuit judges an undershoot.

* * * * *